United States Patent
Cundiff, Sr.

(10) Patent No.: US 6,295,265 B1
(45) Date of Patent: Sep. 25, 2001

(54) UNIQUE TRAY GEOMETRY TO ALLOW FOR VERTICAL LOADING OF OPTICAL DISC IN OPTICAL DRIVE

(75) Inventor: Raymond M Cundiff, Sr., Loveland, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/411,755

(22) Filed: Oct. 4, 1999

(51) Int. Cl.$^7$ .................................................. G11B 17/04
(52) U.S. Cl. ............................................................... 369/75.2
(58) Field of Search .................................. 369/75.1, 75.2, 369/77.1

(56) References Cited

U.S. PATENT DOCUMENTS

| | | | |
|---|---|---|---|
| 4,744,072 | 5/1988 | Tamaki et al. | 369/75.2 |
| 4,862,445 | 8/1989 | Sasaki | 369/75.2 |
| 5,737,304 * | 4/1998 | Soga et al. | 369/247 |
| 5,781,523 | 7/1998 | Ozawa et al. | 369/77.1 |
| 5,805,554 | 9/1998 | Suzuki et al. | 369/77.1 |
| 5,878,013 | 3/1999 | Maeda et al. | 369/77.1 |
| 5,930,218 * | 7/1999 | Mitsui et al. | 369/77.1 |

FOREIGN PATENT DOCUMENTS

| | | |
|---|---|---|
| 56-7266 | 1/1981 | (JP) . |
| 63-271754 | 11/1988 | (JP) . |
| 1-150268 | 6/1989 | (JP) . |
| 2-118983 | 5/1990 | (JP) . |
| 5-198068 | 8/1993 | (JP) . |
| 6-251479 * | 9/1994 | (JP) . |
| 7-312074 | 11/1995 | (JP) . |
| 8-7430 * | 1/1996 | (JP) . |
| 8-045153 | 2/1996 | (JP) . |
| 8-096565 | 4/1996 | (JP) . |
| 8-235715 | 9/1996 | (JP) . |
| 9-134567 | 5/1997 | (JP) . |
| 9-245406 * | 9/1997 | (JP) . |
| 9-251692 * | 9/1997 | (JP) . |
| 9-251693 * | 9/1997 | (JP) . |
| 9-320162 | 12/1997 | (JP) . |
| 10-302363 | 11/1998 | (JP) . |
| 11-39761 * | 2/1999 | (JP) . |
| 11-39762 * | 2/1999 | (JP) . |
| 11-167760 * | 6/1999 | (JP) . |

* cited by examiner

*Primary Examiner*—William Klimowicz

(57) ABSTRACT

Unique geometry is utilized within a disc receptacle of an optical drive to hold an optical disc within the receptacle when oriented vertically. In a preferred embodiment, rim projections strategically positioned along the rim of a cavity for receiving a disc within the receptacle maintain a disc within the receptacle. In a preferred embodiment, a first rim projection is positioned on the rim at angle $\theta_1$ from 10–80 degrees from a horizontal diameter line of the cavity, and a second rim projection is positioned on the rim at angle $\theta_2$ from 10–80 degrees from a horizontal diameter line of the cavity. Moreover, in a preferred embodiment such rim projections are substantially wedge shaped and protrude from the rim at a strategic angle to maintain a disc within the receptacle. In a preferred embodiment, such rim projections protrude from the rim at an angle $\alpha$ having a value selected from 2 to 20 degrees. In a most preferred embodiment, such rim projections are both radially and elevationally fixed on the rim. In a preferred embodiment, a user can easily place a disc into a vertically oriented receptacle with little effort and little potential for damaging the disc. Furthermore, utilizing such rim projections allows for an optical drive having an industrially desirable, low profile design. Also, in a preferred embodiment, the receptacle can be oriented either horizontally or vertically, and such rim projections allow for effective loading/unloading with either orientation.

20 Claims, 3 Drawing Sheets

UNIQUE TRAY GEOMETRY TO ALLOW FOR VERTICAL LOADING OF OPTICAL DISC IN OPTICAL DRIVE

RELATED APPLICATIONS

This application is related to co-pending and commonly owned U.S. patent application Ser. No. 09/412,036, filed concurrently herewith, entitled "ORIENTATION OF DRIVE MECHANICS TO ALLOW FOR DISC LOADING IN AN OFF-AXIS POSITION," and co-pending and commonly owned U.S. patent application Ser. No. 09/410,878, filed concurrently herewith, entitled "USING A TOP-HINGED SHUTTER ON A DRIVE TO SUPPLY A RETAINING FORCE TO HOLD A DISC IN POSITION FOR VERTICAL INSERTION," which are hereby incorporated herein by reference.

TECHNICAL FIELD

This application relates in general to optical drives, and in specific to a method, system and apparatus for vertically loading/unloading an optical disc in an optical drive.

BACKGROUND

Optical discs, such as compact discs (CDs) and digital versatile discs (DVDs), are widely used for storing data, such as textual data, audio data, and video data. Optical drives are available in the prior art for reading data from and/or writing data to such optical discs. Prior art optical drives typically include a carrier component or receptacle, such as a "tray," that operates to receive an optical disc and hold the disc in place while the disc is being transported or "fed" into the optical drive. For example, a personal computer (PC) can include a CD drive for reading CDs. Such CD drive will typically include a tray that extends from the drive to receive a CD, and then retracts back into the drive transporting such a received CD into the optical drive.

Optical drives have traditionally been positioned horizontally, such that an optical disc can lay flat on the optical drive's tray. However, some optical drives of the prior art are positioned vertically, such that an optical disc is received into the drive in an upright position. Because the optical disc is placed into the tray of a vertical optical drive in an upright position, rather than laying flat on such a tray (as with horizontal drives), a mechanism is required in the prior art for holding the optical disc securely in the tray. That is, a mechanism is required for prior art vertical drives for holding the optical disc securely in the drive's tray to prevent the optical disc from falling out of the tray. Typically, adjustable tabs have been utilized in the prior art to hold an optical disc in place in the tray. Such tabs generally extend from the edge of the tray over the optical disc to prevent the disc from falling out of the tray.

Turning to FIG. 1, an example of a prior art optical drive's tray 102 is illustrated. As shown, adjustable tabs 104 are included on tray 102 to hold optical disc 106 in tray 102 as the tray retracts into the optical drive. Typically, such tabs 104 can be manually adjusted radially by a user to extend over optical disc 106. That is, a prior art tray 102 will typically include radially adjustable tabs 104 that can each be manually extended by a user to hold a disc 106 in tray 102 when positioned vertically. For example, as shown in FIG. 1, tabs $104_1$ and $104_2$ have been radially extended over optical disc 106 and tabs $104_3$ and $104_4$ have not been so extended by a user.

Generally, both horizontally positioned drives and vertically positioned drives include such adjustable tabs 104. Horizontally positioned drives typically include such tabs 104 to allow users the ability to place the drive in a vertical, rather than horizontal position. For example, an optical drive can be included in a PC such that the drive is positioned horizontally when the PC's case is laying flat. However, the drive's tray may include adjustable tabs 104 to allow a user to reposition the PC such that the optical drive is positioned vertically (e.g., stand the case on its side), wherein the adjustable tabs can be manually extended by a user to allow an optical drive's tray 102 to hold an optical disc 106 in such a vertical position.

During operation, the optical drive typically lifts the optical disc off of the tray 102, such that the optical disc is clear of the tray's surface. Moreover, the adjustable tabs 104 are typically positioned at a height 110 above the optical disc 106 such that the optical disc does not contact the tabs 104 when lifted off of tray 102 (i.e., during operation of the optical drive). Typically, height 110 is approximately 5 millimeters. Accordingly, during operation, the optical drive's spindle lifts the optical disc 106 off of the tray 102, and the disc 106 spins beneath the adjustable tabs 104 without contacting such tabs 104. As a result, the overall height 108 of the tray 102 (which may also be thought of as the tray's "thickness" or the tray's "width" when the tray is oriented vertically) is required to be larger than the height 110 necessary for operating with the tabs 104 extended.

Alternatively, prior art tabs 104 may be elevationally adjustable, such that the tabs 104 raise or rotate upward away from optical disc 106. For example, an optical drive may elevationally adjust the tabs 104 by causing the tabs 104 to rotate upward away from optical disc 106 during operation of the drive to allow for sufficient space for the optical disc 106 to spin beneath the tabs 104. Thus, the height 110 may be reduced until disc 106 is transported into the optical drive, and thereafter height 110 is effectively increased by the optical drive elevationally adjusting the tabs 104. In such case, sufficient space is required once tray 102 is inserted within the optical drive to allow the tabs 104 to rotate upward away from optical disc 106 in the manner described above. Accordingly, height 108 of tray 102 is effectively increased because the tabs 104 must elevationally adjust within the optical drive. A prior art tray 102 typically has a height 108 of approximately 15 millimeters or more.

For ease of explanation and consistency, the dimension 108 of an optical disc tray will be referred to herein as the tray's "height" or "thickness" while the dimension 112 will be referred to herein as the tray's "length" and the dimension 114 will be referred to herein as the tray's "depth." Thus, for ease of explanation and consistency herein, the term "height" or "thickness" will be used to refer to dimension 108, the term "length" will be used to refer to dimension 112, and the term "depth" will be used to refer to dimension 114 of an optical drive's tray, regardless of whether such tray is oriented horizontally or vertically.

Several problems exist with the above-described prior art. First, utilizing such adjustable tabs 104 requires that the overall height 108 of the tray 102 be larger than the height 110 necessary for operating with the tabs 104 extended. Accordingly, a low profile tray having a small overall height 108 is not available with prior art trays 102 having tabs 104. Additionally, tabs 104 are typically inconvenient for a user, and tabs 104 can damage an optical disc 106. Tabs 104 generally must be manually extended by a user. Accordingly, when operating an optical drive in a vertical position, a user is typically required to manually extend the tabs 104 to hold an optical disc 106 in tray 102 while the disc is fed to the optical drive.

Such adjustable tabs 104 require undesirable effort on the part of a user in loading and unloading an optical disc 106. A user can manually adjust the tabs 104 to load/unload a disc 106 in tray 102 such that the disc 106 does not encounter the tabs 104. For example, a user can place a disc 106 in tray 102 having tabs 104 retracted (i.e., not extended radially), and thereafter the user can manually extend the tabs 104 radially over disc 106. When the user desires to remove the disc 106, the user can manually retract the tabs 104 and then remove the disc 106 clear of the tabs 104. Manually adjusting the tabs 104 each time that a user loads/unloads a disc 106 is undesirable because it increases the amount of time and effort required in loading/unloading a disc 106. Additionally, adjusting (e.g., retracting/extending) the tabs 104 in this manner is cumbersome for a user because the user typically must hold the disc 106 in vertical tray 102 with one hand to prevent the disc 106 from falling out of the tray 102, while the user manually adjusts the tabs 104 with the user's other hand. Furthermore, such manual adjustment by a user of tabs 104 increases the potential that a user will inadvertently break or damage the tabs, thus reducing the life of the product.

Alternatively, tabs 104 can be extended by a user, and a user can physically force a disc 106 past the extended tabs 104 in loading/unloading disc 106. Thus, rather than manually adjusting the tabs 104 each time that a user loads/unloads a disc 106 to/from tray 102, the user may leave the tabs 104 extended and physically force an optical disc past the tabs during such loading/unloading. However, contacting the tabs 104 with disc 106 in this manner can damage disc 106 and possibly result in disc 106 being unreadable by an optical drive. That is, forcing a disc 106 past the extended tabs can scratch the reflective surface of the optical disc, which may result in data loss from the disc. Also, such tabs 104 are an additional part that must be manufactured and implemented within such prior art trays 102. Accordingly, the overall cost for manufacturing and assembling such prior art trays 102 are higher than if such additional tabs 104 were not required.

In view of the above, there exists a desire for a method, apparatus and system for vertically loading/unloading an optical disc in an optical drive. There exists a further desire for a method, apparatus and system for loading/unloading an optical disc in an optical drive that allow for a low profile receptacle to be implemented within an optical drive. There exists still a further desire for a method, apparatus and system that allow a user to easily perform vertical loading/unloading of an optical disc in an optical drive. There exists still a further desire for a method, apparatus and system that require no added effort on the part of a user in vertically loading/unloading an optical disc in an optical drive. There exists a further desire for a method, apparatus and system for vertically loading/unloading an optical disc in an optical drive that reduce the potential for damaging an optical disc during such loading/unloading. There exists yet a further desire for a method, apparatus and system for vertically loading/unloading an optical disc in an optical drive that are readily adaptable for horizontal loading/unloading of an optical disc. Accordingly, if an optical drive is oriented horizontally, such method, apparatus and system would be operable for horizontally loading/unloading an optical disc in such optical drive, without requiring modification.

SUMMARY OF THE INVENTION

These and other objects, features and technical advantages are achieved by a system, apparatus and method which utilize unique geometry for a disc receptacle of an optical drive to hold an optical disc within the disc receptacle. In a preferred embodiment, rim projections strategically positioned along the sidewall or rim of a cavity for receiving a disc within a disc receptacle maintain an optical disc within the disc receptacle when the disc receptacle is oriented vertically. That is, such rim projections work to prevent an optical disc from inadvertently falling out of the disc receptacle when the disc receptacle is oriented vertically. Moreover, in a preferred embodiment such rim projections have substantially a wedge shape that protrudes from the rim of such cavity at a strategic angle to maintain an optical disc within the disc receptacle when the disc receptacle is oriented vertically.

In a preferred embodiment, a receptacle that is operable to transport an optical disc to an optical drive comprises a cavity that can receive an optical disc. Such cavity is at least partially surrounded by a rim. In a preferred embodiment, at least two rim projections protrude from the rim to prevent an optical disc from inadvertently falling out of the receptacle when it is oriented vertically. In a preferred embodiment, such rim projections are radially fixed on the rim. In an alternative embodiment, such rim projections are elevationally fixed on the rim. In a most preferred embodiment, such rim projections are both radially and elevationally fixed on the rim. Accordingly, a user is not required to adjust the rim projections to maintain an optical disc within the transporting receptacle, when such receptacle is oriented vertically.

In a most preferred embodiment, at least two rim projections are positioned on the rim in a lower semicircle of the cavity that is formed from an imaginary horizontal diameter line of the receptacle's cavity that is substantially parallel with the depth dimension of the receptacle. Accordingly, when an optical disc is placed in the cavity, such at least two rim projections in the lower semicircle work to prevent the optical disc from inadvertently falling out of the receptacle. In a preferred embodiment, the rim projections are strategically positioned along the cavity's rim for optimum performance in maintaining an optical disc in a vertically oriented receptacle. In a preferred embodiment, a first rim projection is positioned on the rim at an angle $\theta_1$ having a value selected from the range of values 10–80 degrees from the imaginary horizontal diameter line of the receptacle's cavity, and a second rim projection is positioned on the rim at an angle $\theta_2$ having a value selected from the range of values 10–80 degrees from the imaginary horizontal diameter line of the receptacle's cavity. In a most preferred embodiment, such angles $\theta_1$ and $\theta_2$ are each approximately 15 degrees.

Additionally, in a preferred embodiment, the rim projections have substantially a wedge shape that protrudes from the cavity's rim at an angle $\alpha$, wherein $\alpha$ is a value selected from the range of values 2–20 degrees. In a most preferred embodiment, such rim projections protrude from the cavity's rim at angle $\alpha$, wherein $\alpha$ is approximately 10 degrees. In a preferred embodiment, the receptacle's cavity has a sufficiently large circumference such that an optical disc can be placed into the cavity without contacting the rim projections protruding from the cavity's rim into the cavity. Accordingly, in a preferred embodiment, a user can easily place an optical disc into a vertically oriented drive with little effort. Moreover, because an optical disc can be placed in the cavity of a transporting receptacle without contacting the rim projections, there is little potential in damaging an optical disc during loading/unloading such disc in a preferred embodiment.

Furthermore, utilizing such rim projections allows for an optical drive having an industrially desirable, low profile design. For example, in a preferred embodiment, the height dimension of such a receptacle is within the range of 10–15 millimeters when utilizing such rim projections to maintain a disc within the receptacle when oriented vertically. Also, in a preferred embodiment, the receptacle can be oriented either horizontally or vertically, and permits an optical disc to be easily loaded with little effort and little potential for damage to such disc, regardless of the receptacle's orientation. Furthermore, a user can alter the orientation of the optical drive from horizontal to vertical without being required to adjust the rim projections or modify the transporting receptacle at all for proper functionality of the receptacle in each orientation. Additionally, because a user is not required to manually adjust the rim projections in a preferred embodiment, there is little potential in a user inadvertently breaking or otherwise damaging such rim projections. Thus, such rim projections will likely have a longer life than prior art adjustable tabs.

It should be appreciated that a technical advantage of a preferred embodiment of the present invention is that a system, method and apparatus for vertically loading/unloading an optical disc in an optical drive are provided wherein a transporting receptacle has an industrially desirable, low profile design. A further technical advantage of a preferred embodiment of the present invention is that a system, method and apparatus for vertically loading/unloading an optical disc in an optical drive are provided that allow easy vertical loading/unloading of an optical disc with little effort on the part of a user and with little potential for damaging such optical disc. A further technical advantage of a preferred embodiment of the present invention is that a system, method and apparatus for vertically loading/unloading an optical disc in an optical drive are provided wherein rim projections are fixed radially and/or elevationally. Accordingly, a user is not required to adjust any mechanisms, such as tabs, to maintain a disc in a transporting receptacle.

Additionally, a fewer overall number of parts are required because separate mechanisms, such as tabs, for maintaining a disc in the transporting receptacle are eliminated. Rather, rim projections integrated within a cavity's rim are utilized in a preferred embodiment. Furthermore, such fixed rim projections are less likely to be inadvertently broken or damaged by a user because a user is not required to manually adjust such rim projections, and therefore such rim projections likely have a relatively longer life span than prior art mechanisms, such as tabs, utilized for maintaining an optical disc within a receptacle. Yet a further technical advantage of a preferred embodiment of the present invention is that a system, method and apparatus for vertically loading/unloading an optical disc in an optical drive are provided that are readily operable in either horizontal or vertical orientation. Accordingly, a preferred embodiment allows for loading/unloading of an optical disc in an optical drive that is oriented horizontally or vertically, without requiring modification or adjustments by the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 2:
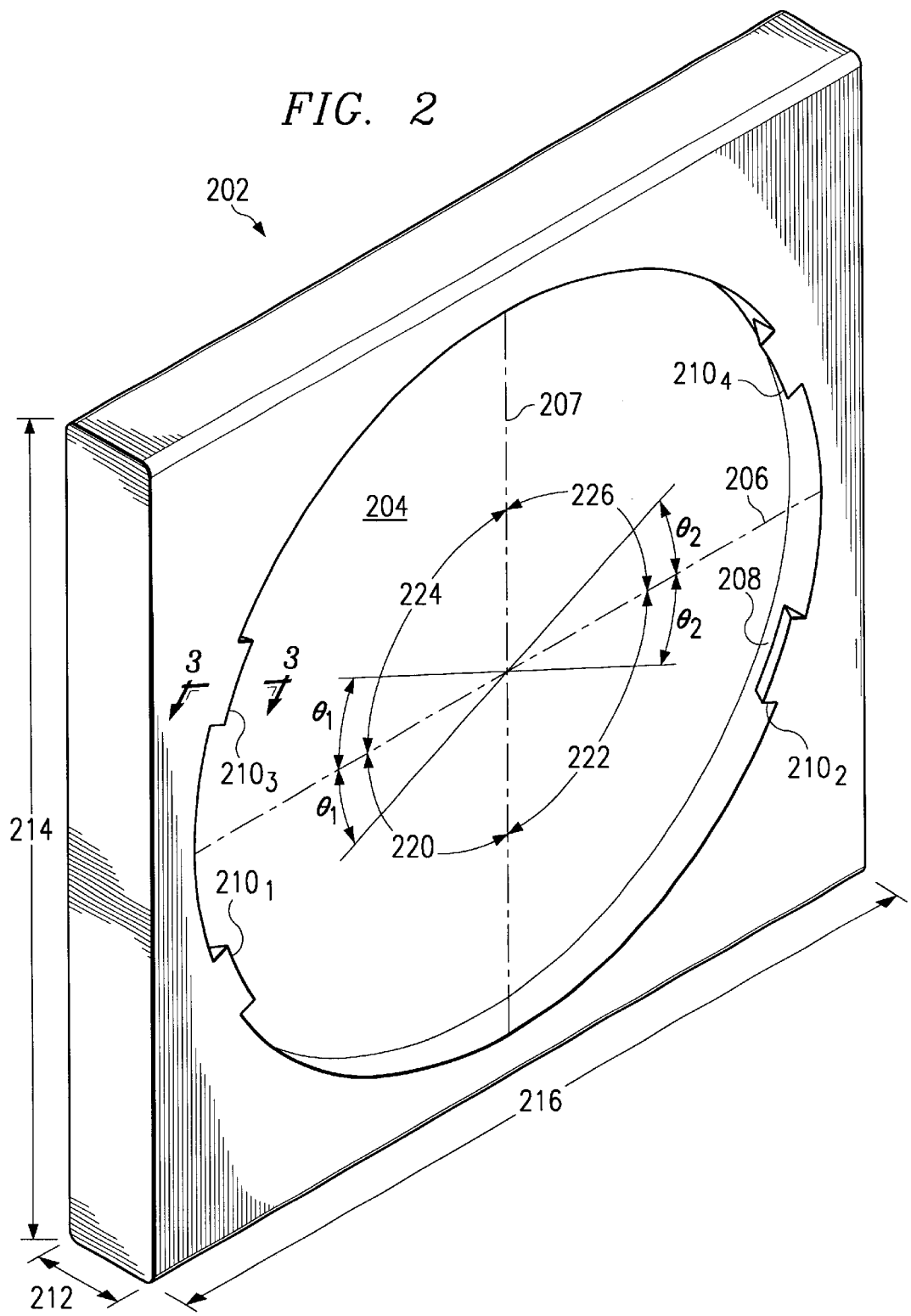
FIG. 2 shows a preferred embodiment for a vertically oriented receptacle.

FIG. 2 shows a preferred embodiment of the present invention. As shown in FIG. 2, receptacle 202 (e.g., a tray) for transporting an optical disc to/from an optical drive is positioned vertically. Although, it should be understood that in a preferred embodiment the optical drive and receptacle may be oriented in any manner (e.g., vertically or horizontally), and such a preferred embodiment is operable for loading/unloading an optical disc in any such orientation. In the preferred embodiment illustrated in FIG. 2, 4 rim projections 210 (which may also be referred to as "wedges" herein) are included in receptacle 202. Such rim projections 210 protrude from the sidewall or "rim" 208 of the cavity 204. Rim 208 is preferably of a substantially circular shape, and such rim 208 can completely or partially surround (or enclose) cavity 204. Thus, for example rim 208 may be a contiguous circle surrounding cavity 204, or rim 208 may be a non-contiguous (e.g., broken) circle surrounding cavity 204.

Cavity 204 is capable of receiving an optical disc to be transported to the optical drive. A user places an optical disc, such as a CD or DVD, in the cavity 204 of receptacle 202, and rim projections 210 work to prevent the optical disc from inadvertently falling out of receptacle 202. That is, rim projections 210 maintain an optical disc in cavity 204 when receptacle 202 is oriented vertically. In a most preferred embodiment, the optical drive is a CD drive. However, it should be understood that in alternative embodiments, the optical drive can be any type of optical drive, including a DVD drive. It should further be understood that any type of optical discs may be utilized in a preferred embodiment, including audio optical discs, video optical discs, and multimedia optical discs.

In a preferred embodiment, an optical disc can be placed into cavity 204 of receptacle 202 without contacting rim projections 210. That is, in a preferred embodiment the radius of the cavity 204 is sufficiently large such that an optical disc can be placed into the cavity without encountering the rim projections 210. Accordingly, a user can easily insert and remove a disc from receptacle 202 with little effort. If the optical drive is positioned (or "oriented") horizontally, an optical disc can be placed flat on the horizontal receptacle. However, if the optical drive is positioned vertically, as shown in FIG. 2, an optical disc can be placed upright on the vertical receptacle 202, and the rim projections 210 work to prevent the optical disc from inadvertently falling out of such a vertical receptacle 202. That is, once an optical disc is placed in the vertical receptacle 202, the optical disc drops to a position wherein the disc engages or is caught by the rim projections 210. Such rim projections 210 "pinch" the outer edge of such optical disc to maintain the disc in the vertical receptacle 202.

For example, suppose a user inserts an optical disc in the vertical receptacle 202 shown in FIG. 2. The disc will fit into the cavity area 204 of receptacle 202 without scraping against or contacting the rim projections 210. Accordingly, a user can easily insert and/or remove an optical disc from receptacle 202 without damaging the disc. Once the disc is placed in the cavity area 204 of receptacle 202, the user can release the disc. The disc will drop downward a short distance, approximately 0.7 millimeters in a preferred embodiment, wherein the disc engages rim projections $210_1$ and $210_2$, assuming that the receptacle is oriented as shown in FIG. 2. Rim projections $210_1$ and $210_2$ work to hold the disc in the receptacle cavity 204. Thus, the disc will be fed properly to the optical drive (not shown), and the optical drive can lift the disc slightly upward (approximately 0.7 millimeters in a preferred embodiment) off of rim projections $210_1$ and $210_2$ so that the disc spins freely during operation of the optical drive (e.g., when reading the optical disc). When a user unloads the disc from vertical receptacle 202, the user lifts the disc slightly upward off of rim projections $210_1$ and $210_2$ and then removes the disc outward from receptacle cavity 204. Again, just as the disc was inserted in receptacle cavity 204 without contacting rim projections 210, the disc can be removed from receptacle cavity 204 without contacting such rim projections 210. Moreover, the user is not required to perform any additional steps, such as adjusting tabs, to load/unload an optical disc to/from receptacle 202. The user is not required to exert any more effort than just placing the disc in receptacle cavity 204 and lifting the disc outward from receptacle cavity 204. The process of loading/unloading a disc is wieldy for a user and may be accomplished with one hand, as opposed to the cumbersome process of the prior art.

Figure 1:
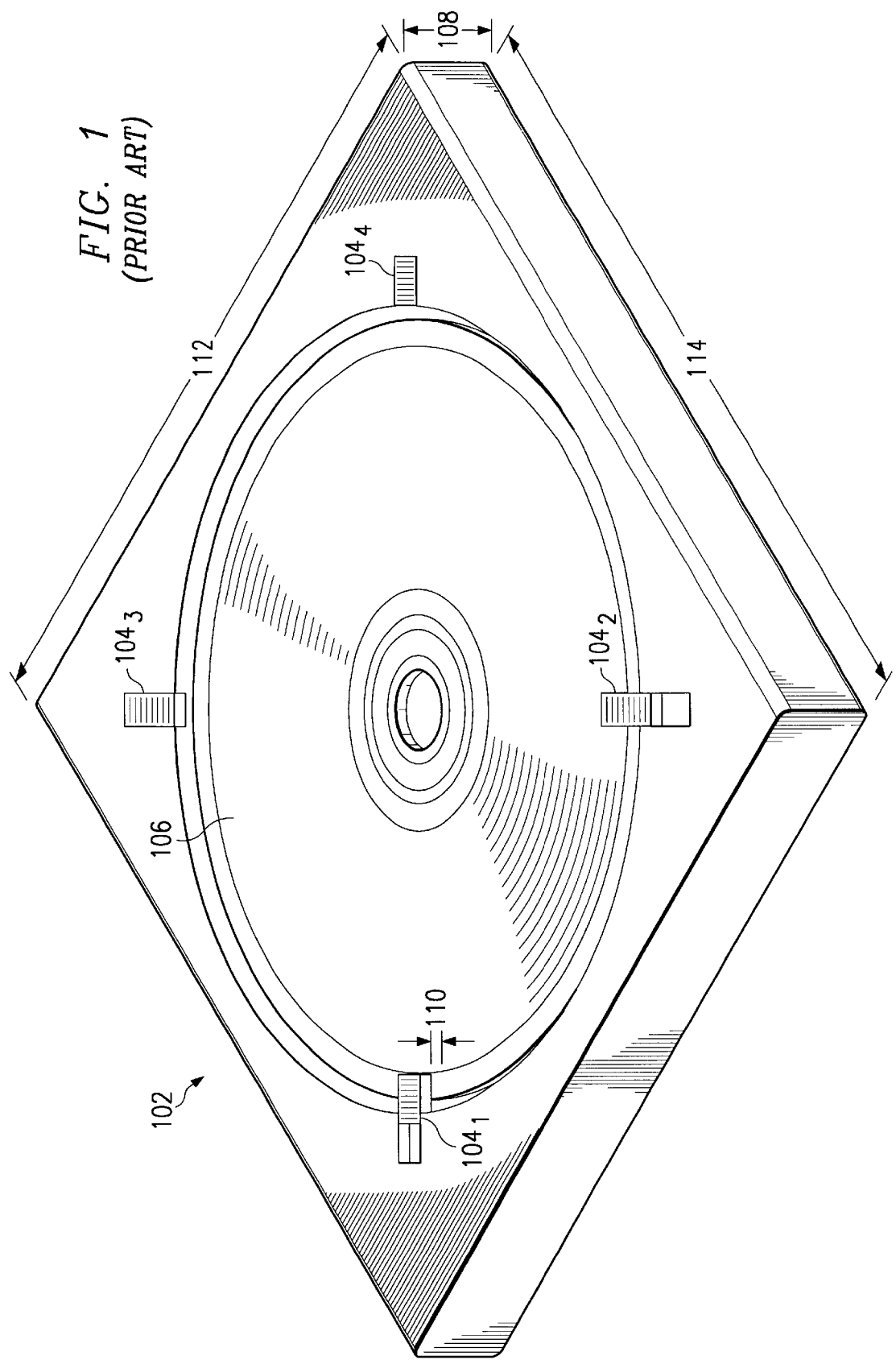
FIG. 1 shows a prior art tray for transporting an optical disc to an optical drive.

As discussed in conjunction with FIG. 1, for ease of explanation and consistency, the dimension 212 of optical disc receptacle 202 will be referred to herein as the receptacle's "height" or "thickness" (corresponding to dimension 108 of FIG. 1), the dimension 214 will be referred to herein as the receptacle's "length" (corresponding to dimension 112 of FIG. 1), and the dimension 216 will be referred to herein as the receptacle's "depth" (corresponding to dimension 114 of FIG. 1), regardless of whether such receptacle 202 is oriented horizontally or vertically. Because tabs of the prior art are not required in a preferred embodiment, receptacle 202 can be implemented with a relatively small height dimension 212. In a preferred embodiment, the height 212 of receptacle 202 is within the range of 10–15 millimeters. In a most preferred embodiment, the height 212 of receptacle 202 is approximately 10 millimeters. Accordingly, a desired low profile is achieved for receptacle 202 in a preferred embodiment. As a result, when such a preferred embodiment is implemented within a larger system, such as a PC, laptop computer, mainframe computer, workstation computer, minicomputer, supercomputer, or other system having an optical drive, the profile of such larger system can be reduced. That is, when a preferred embodiment is implemented within a larger system, the overall height or thickness of such larger system can be reduced, resulting in a lower profile system.

In a preferred embodiment, rim projections 210 are strategically positioned along rim 208. For ease of explanation of such a preferred embodiment, an imaginary horizontal diameter line 206 of receptacle cavity 204 and an imaginary vertical diameter line 207 of receptacle cavity 204 are provided as references in FIG. 2. As shown in FIG. 2, horizontal diameter line 206 runs substantially parallel to the depth dimension 216 of receptacle 202 dividing receptacle cavity 204 into upper and lower semicircles. Also as shown in FIG. 2, vertical diameter line 207 runs substantially parallel to the length dimension 214 of receptacle 202 dividing receptacle cavity 204 into front and back semi-circles. Thus, horizontal diameter line 206 and vertical diameter line 207 divide receptacle cavity 204 into four imaginary quadrants of substantially equal size. That is, horizontal diameter line 206 and vertical diameter line 207 divide receptacle cavity 204 into a lower front quadrant 220, a lower back quadrant 222, an upper front quadrant 224, and an upper back quadrant 226. As illustrated in FIG. 2, in a most preferred embodiment, a rim projection 210 is provided in each of the four quadrants 220, 222, 224 and 226 formed by horizontal diameter line 206 and vertical diameter line 207.

As shown in FIG. 2, rim projections 210, and 2103 are positioned at an angle $\theta_1$ from the diameter line 206 of the cavity 204, and rim projections $210_2$ and $210_4$ are positioned at an angle $\theta_2$ from the diameter line 206. Generally, as $\theta_1$ and $\theta_2$ are decreased the holding force on the optical disc in cavity 204 is increased. However, as the angles $\theta_1$ and $\theta_2$ approach 0, a point is reached wherein the rim projections 210 fail to hold the optical disc. That is, as the angles $\theta_1$ and $\theta_2$ approach 0, the optical disc will drop through the rim projections 210 and fall out of the vertical receptacle 202. On the other hand, as $\theta_1$ and $\theta_2$ are increased above a certain point then a slight vibration or imbalance may result in the optical disc falling out of vertical receptacle 202, as is discussed in greater detail below in conjunction with FIG. 4. In a preferred embodiment, angles $\theta_1$ and $\theta_2$ are within the range of 10–80 degrees. Preferably, angles $\theta_1$ and $\theta_2$ are within the range of 10–45 degrees. Most preferably, angles $\theta_1$ and $\theta_2$ have value 15 degrees. Additionally, in a most preferred embodiment, angles $\theta_1$ and $\theta_2$ are equal.

In a preferred embodiment, such rim projections 210 are fixed or set permanently to protrude from the sidewall 208 of cavity 204. Thus, a user is not required to manually adjust such rim projections, as with the adjustable tabs utilized in the prior art. In a most preferred embodiment, the rim projections 210 are fixed both radially and elevationally. Thus, a user is not required to adjust the rim projections 210 radially (e.g., extend the rim projections) and the optical drive is not required to adjust the rim projections 210 elevationally (e.g., rotating the rim projections upward from the optical disc) as is typically required with prior art tabs. In an alternative embodiment, the rim projections 210 are fixed radially, but can be adjusted elevationally.

In a further alternative embodiment, the rim projections can be adjusted circumferentially, wherein rim projections 210 can be adjusted around all or a portion of the circumference of rim 208. For example, in such a further alternative embodiment, suppose 2 rim projections 210 are provided within receptacle 202. A first of such 2 rim projections 210 can be circumferentially adjusted along the front semicircle formed by vertical diameter 207, and the other of such 2 rim projections 210 can be circumferentially adjusted along the back semicircle formed by vertical diameter 207.

Accordingly, such 2 rim projections 210 can be circumferentially adjusted about rim 208 to accomplish the respective positions of rim projections $210_1$ and $210_2$ shown in FIG. 2, and such 2 rim projections 210 can be circumferentially adjusted about rim 208 to accomplish the respective positions of rim projections $210_3$ and $210_4$ shown in FIG. 2. Accordingly, utilizing only 2 of such circumferentially adjustable rim projections 210 allows the receptacle 202 to be oriented vertically without having a designated top or bottom, and such circumferentially adjustable rim projections 210 can be adjusted to maintain an optical disc in cavity 204 in any vertical orientation. However, in a most preferred embodiment, rim projections 210 are completely fixed, such that they are not adjustable radially, elevationally, or circumferentially.

Figure 3:
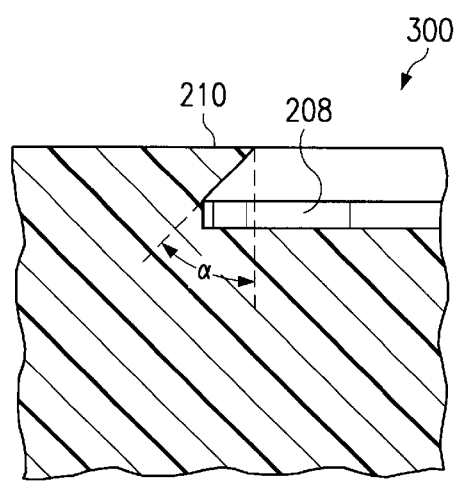
FIG. 3 shows the cross section indicated in FIG. 2 to illustrate the angle that a rim projection protrudes from the cavity's rim in a preferred embodiment.

Turning to FIG. 3, cross section 300 is illustrated. As shown in FIG. 3, in a preferred embodiment, each rim projection or "wedge" 210 protrudes from rim 208 into cavity 204 at an angle $\alpha$. In a preferred embodiment, the angle $\alpha$ is within the range of 2 to 20 degrees. Preferably, angle $\alpha$ is within the range of 3 to 15 degrees. Most preferably, angle $\alpha$ is approximately 10 degrees. As angle $\alpha$ is reduced to values less than 3 degrees, rim projection 210 may fail to hold an optical disc within cavity 204. On the other hand, as angle $\alpha$ is increased to values greater than 15 degrees, rim projections 210 may cause a disc to "stick" in cavity 204.

Figure 4:
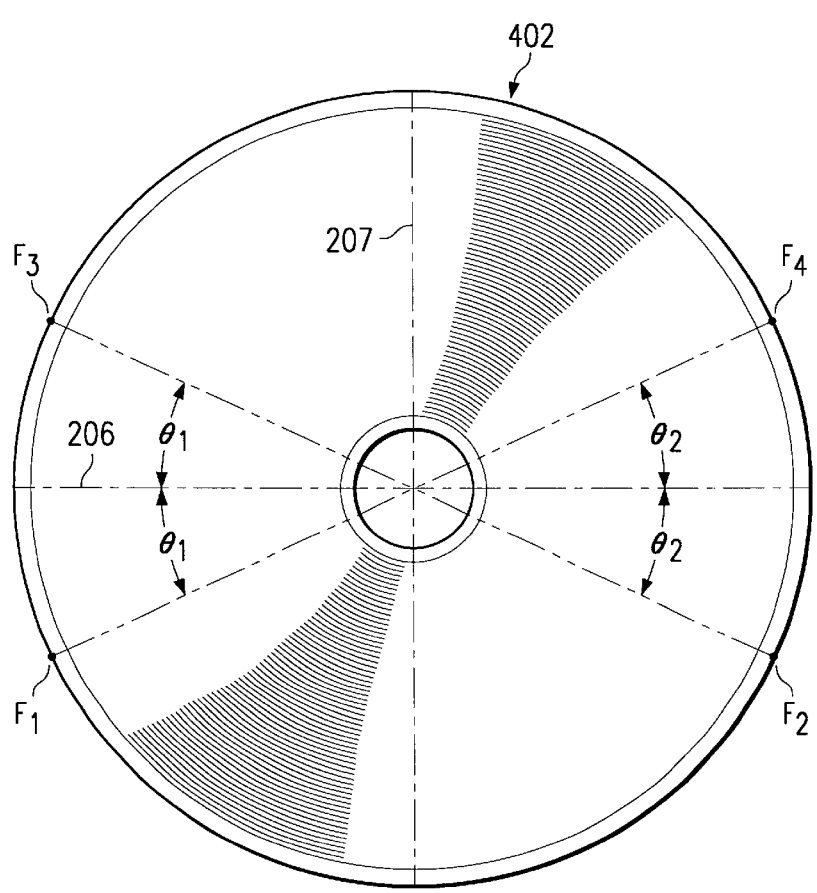
FIG. 4 shows the potential forces that can be applied to a disc to maintain a disc in a receptacle in a preferred embodiment.

FIG. 4 illustrates the potential forces applied to an optical disc 402 that is placed in a vertical receptacle 202 (not shown) of a preferred embodiment. As shown, in a preferred embodiment, vector forces $F_1$, $F_2$, $F_3$, and $F_4$ are potentially applied to optical disc 402 by rim projections $210_1$, $210_2$, $210_3$, and $210_4$, respectively. As discussed in the above example, in a preferred embodiment only two of the forces $F_1$, $F_2$, $F_3$ and $F_4$ are actually applied to a disc 402 inserted in a vertical receptacle 202 (e.g., forces $F_1$ and $F_2$). However, in alternative embodiments, additional forces may be actually applied to a disc 402 inserted in a vertical receptacle 202. For example, in an alternative embodiment, forces $F_1$, $F_2$ and one of either $F_3$ and $F_4$ may be applied to a disc 402 from rim projections 210, $210_2$ and one of either $210_3$ and $210_4$, respectively. Additionally, in alternative embodiments, additional rim projections 210 can be provided, resulting in additional forces being applied to a disc 402.

Figure 5:
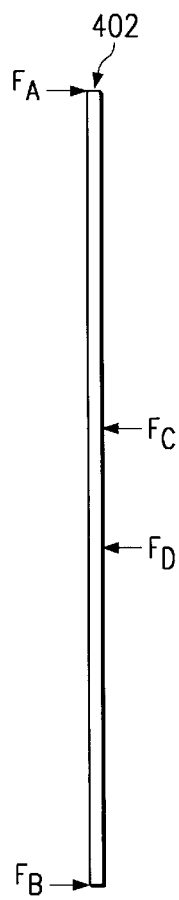
FIG. 5 shows a side view of a disc to illustrate the potential forces that can be applied to a disc to maintain a disc in a receptacle in a preferred embodiment.

FIG. 5 shows a cross section or side view of optical disc 402 in vertical receptacle 202 (not shown). As shown, vector forces $F_A$ and $F_B$ are applied to the optical disc 402 from vertical receptacle 202. As illustrated in FIG. 5, vector forces $F_A$ and $F_B$ apply outward force to the optical disc 402 from receptacle 202. Most preferably, a raised area or "ledge" around the bottom of cavity 204 just inside the cavity's side wall 208 that is typically provided in such a receptacle 202 applies forces $F_A$ and $F_B$ to the optical disc 402.

Force vectors $F_C$ and $F_D$ represent the forces applied to disc 402 by rim projections 210 of vertical receptacle 202. That is, force vectors $F_C$ and $F_D$ represent the inward forces applied to disc 402 toward receptacle cavity 204. Force vector $F_C$ represents a conglomeration of forces applied to disc 402 by rim projections $210_2$ and $210_4$. Similarly, force vector $F_D$ represents a conglomeration of forces applied to disc 402 by rim projections $210_1$ and $210_3$. It should be recognized that as angles $\theta_1$ and $\theta_2$ of FIG. 2 increase, force vector $F_C$ moves upward and force vector $F_D$ moves downward. As force vector $F_C$ moves upward and force vector $F_D$ moves downward in FIG. 5, the optical disc 402 becomes less stable. For example, as force vector $F_D$ moves further and further downward, the moment arm of such force $F_D$ is reduced. As a result, a slight vibration or imbalance may cause the moment arm of the center mass of the disc 402 to be more prevalent, resulting in the disc 402 falling out of vertical receptacle 202.

As discussed above, the most preferred angle for $\theta_1$ and $\theta_2$ is 15 degrees. However, values for $\theta_1$ and $\theta_2$ may range in a preferred embodiment from 10–80 degrees. Additionally, even though 4 rim projections 210 have been discussed herein, additional rim projections 210 may be implemented within a vertical receptacle 202 for loading/unloading an optical disc to/from an optical drive, and any such implementation is intended to be within the scope of the present invention. The present invention is not intended to be limited only to the 4 rim projections 210 provided herein, rather such 4 rim projections 210 is intended as an example that renders the disclosure enabling for many other implementations having different numbers of rim projections 210.

Moreover, alternative embodiments may be implemented having as few as 2 rim projections 210. For example, vertical receptacle 202 shown in FIG. 2 may have a designated top and bottom when oriented vertically, and rim projections $210_1$ and $210_2$ may be located at the designated bottom of such receptacle 202 to hold an optical disc for loading/unloading to/from an optical drive. Accordingly, in such an implementation a user can orient the optical drive for horizontal loading/unloading, or the user can orient the optical drive for vertical loading/unloading by positioning such vertical drive wherein the 2 rim projections $210_1$ and $210_2$ are located at the bottom of the vertical receptacle 202. For instance, the optical drive may provide a label "THIS SIDE UP" for vertical loading/unloading that instructs the user of the proper position for the optical drive when oriented vertically to allow rim projections $210_1$ and $210_2$ to be positioned at the bottom of receptacle 202 to hold an optical disc in such receptacle.

It should be understood that a preferred embodiment permits a drive to be oriented in any manner (e.g., vertically or horizontally) and performs loading/unloading to/from an optical drive in any such orientation without requiring modification by a user. For example, a user is not required to manually adjust tabs or other mechanisms for holding an optical disc an a receptacle 202 when orienting the optical drive vertically. Thus, the optical drive may be oriented in any manner in a preferred embodiment without requiring additional effort on the part of the user to allow loading/unloading to/from such drive.

Moreover, it should be understood that a preferred embodiment allows an optical disc to be loaded/unloaded to/from a receptacle 202 easily, with little effort on the part of the user, and without requiring the user to force the disc past tabs or other mechanisms that may potentially damage the disc. Additionally, because the tabs of the prior art are not required in a preferred embodiment, the overall height 212 or thickness of a receptacle 202 is reduced to provide a low profile receptacle, which may allow for a low profile system (e.g., PC, laptop computer, or other computer system that has an optical drive). A most preferred embodiment provides a low profile receptacle 202 that has a height of approximately 10 millimeters. Although, alternative embodiments may be implemented with receptacle 202 having any height.

As described herein, a preferred embodiment can be utilized for loading/unloading an optical disc in any orientation, including either horizontal or vertical.

Accordingly, a preferred embodiment can be utilized for loading/unloading an optical disc in an off-axis orientation as provided in co-pending and commonly assigned U.S. patent application Ser. No. 09/412,036, entitled "ORIENTATION OF DRIVE MECHANICS TO ALLOW FOR DISC LOADING IN AN OFF-AXIS POSITION." Also, as described herein a preferred embodiment does not require any additional maintaining mechanism other than rim projections 210. However, the present invention is not intended to be limited only to embodiments lacking additional maintaining mechanisms. Rather, the present invention is intended to encompass embodiments that include maintaining mechanisms in addition to rim projections 210 for aiding in maintaining an optical disc in a receptacle for transporting such disc to the optical drive. For example, the mechanisms described in U.S. patent application Ser. No. 09/410,878, entitled "USING A TOP-HINGED SHUTTER ON A DRIVE TO SUPPLY A RETAINING FORCE TO HOLD A DISC IN POSITION FOR VERTICAL INSERTION," can also be implemented with the embodiments provided herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical drive comprising:
   a receptacle that is operable to transport an optical disc to said optical drive, wherein said receptacle comprises height, length and depth dimensions;
   said receptacle comprising a cavity that receives said optical disc, wherein said cavity is at least partially surrounded by a rim; and
   said rim comprising at least two radially fixed rim projections that prevent said optical disc from falling out of said receptacle when said receptacle is oriented vertically, wherein said rim projections are each a wedge that projects from said rim at an angle α, wherein said α is a value selected from the range of values 2 to 20 degrees.

2. The optical drive of claim 1, wherein said rim projection is a wedge that projects from said rim at an angle α, wherein said α is approximately 10 degrees.

3. The optical drive of claim 1, wherein said cavity has a circumference that is large enough that said optical disc can be placed into said cavity without contacting said at least one rim projection.

4. The optical drive of claim 1, wherein said height dimension of said receptacle is within the range of 10 millimeters to 15 millimeters.

5. The optical drive of claim 1, wherein said optical drive is selected from the group consisting of:
   a CD drive and a DVD drive.

6. The optical drive of claim 1, wherein said optical disc is selected from the group consisting of:
   a CD, a DVD, an audio optical disc, a video optical disc, and a multimedia optical disc.

7. The optical drive of claim 1, wherein said at least two rim projections are elevationally fixed on said rim, wherein said at least two rim projections are not adjustable by a user.

8. The optical drive of claim 1, further comprising:
   at least two of said at least two rim projections are positioned on said rim in a lower semicircle of said cavity, wherein said lower semicircle of said cavity is formed from a horizontal diameter line of said cavity that is substantially parallel with said depth dimension of said receptacle.

9. The optical drive of claim 1, further comprising:
   a first one of said at least two rim projections is positioned on said rim at an angle $\theta_1$ having a value selected from the range of values 10 degrees to 80 degrees from a horizontal diameter line of said cavity, wherein said horizontal diameter line is substantially parallel with said depth dimension of said receptacle; and
   a second one of said at least two rim projections is positioned on said rim at an angle $\theta_2$ having a value selected from the range of values 10 degrees to 80 degrees from said horizontal diameter line of said cavity.

10. The optical drive of claim 9, wherein said angle $\theta_1$ is approximately 15 degrees, and wherein said angle $\theta_2$ is approximately 15 degrees.

11. The optical drive of claim 1, wherein said at least two rim projections are movably adjustable about the circumference of said rim.

12. A system comprising:
    an optical drive;
    said optical drive comprising a means for transporting an optical disc to said optical drive, wherein said means for transporting comprises height, length and depth dimensions;
    said means for transporting comprising a means for receiving said optical disc, wherein said means for receiving is at least partially surrounded by a rim; and
    said rim comprising at least two elevationally fixed means for maintaining said optical disc within said means for receiving to prevent said optical disc from inadvertently falling out of said means for receiving when said means for transporting is oriented vertically, wherein said at least two elevationally fixed means for maintaining are wedges protruding from said rim at an angle α, wherein said α is a value selected from the range of values 2 to 20 degrees.

13. The system of claim 12, wherein said optical drive is oriented within said system substantially vertically.

14. The system of claim 12, comprising a computer system selected from the group consisting of:
    a PC, a laptop computer, a mainframe computer, a workstation computer, a minicomputer, and a supercomputer.

15. The system of claim 12, wherein said at least two elevationally fixed means for maintaining are radially fixed.

16. The system of claim 12, wherein a first one of said at least two elevationally fixed means for maintaining is positioned on said rim within a lower front quadrant, said lower front quadrant formed by a horizontal diameter line of said means for receiving that is substantially parallel with said depth dimension and a vertical diameter line of said means for receiving that is substantially parallel with said length dimension, and wherein a second one of said at least two elevationally fixed means for maintaining is positioned on said rim within a lower back quadrant formed by said horizontal diameter line and said vertical diameter line.

17. The system of claim 16, wherein said first one of said at least two elevationally fixed means for maintaining is positioned on said rim at an angle $\theta_1$ having a value selected from the range of 10 degrees to 45 degrees from said horizontal diameter line of said means for receiving, and wherein said second one of said at least two elevationally fixed means for maintaining is positioned on said rim at an angle $\theta_2$ having a value selected from 10 degrees to 45 degrees from said horizontal diameter line of said means for receiving.

18. The system of claim 12, wherein said at least two elevationally fixed means for maintaining are movably adjustable about the circumference of said rim.

19. A method of vertically loading an optical disc in an optical drive, the method comprising:

extending a receptacle having height, length, and depth dimensions from said optical drive;

receiving an optical disc in a cavity of said receptacle, wherein said cavity comprises a rim that at least partially surrounds said cavity and wherein said cavity is capable of receiving said optical disc without requiring said optical disc to contact any one of at least two radially fixed rim projections;

maintaining said optical disc in said cavity with said at least two radially fixed rim projections, said rim projections each comprising a wedge protruding from said rim at an angle $\alpha$ having a value selected from the range of values 2 to 20 degrees; and retracting said receptacle into said optical drive to transport said optical disc to said optical drive.

20. The method of claim 19, wherein said maintaining further comprises:

maintaining said optical disc in said cavity with said at least two radially fixed rim projections, wherein a first one of said at least two radially fixed rim projections is positioned on said rim at an angle $\theta_1$ having a value selected from the range of 10 degrees to 45 degrees from a horizontal diameter line that is substantially parallel with said depth dimension of said receptacle, and wherein a second one of said at least two radially fixed rim projections is positioned on said rim at an angle $\theta_2$ having a value selected from the range of 10 degrees to 45 degrees from said horizontal diameter line of said cavity.

* * * * *